US006812889B2

(12) United States Patent
Alexander, Jr.

(10) Patent No.: US 6,812,889 B2
(45) Date of Patent: Nov. 2, 2004

(54) METHODS AND APPARATUS FOR DETERMINING A DIRECTION OF ARRIVAL IN A WIRELESS COMMUNICATION SYSTEM

(75) Inventor: William Francis Alexander, Jr., Monterey, CA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/056,434

(22) Filed: Jan. 24, 2002

(65) Prior Publication Data

US 2003/0137454 A1 Jul. 24, 2003

(51) Int. Cl.$^7$ .............................. G01S 5/04; H04Q 7/20
(52) U.S. Cl. .................................... 342/442; 455/456.1
(58) Field of Search ................................ 342/442, 453, 342/368–384; 455/456–457, 456.1

(56) References Cited

U.S. PATENT DOCUMENTS

| | | | | |
|---|---|---|---|---|
| 4,170,774 A | * | 10/1979 | Schaefer | 342/442 |
| 4,320,400 A | * | 3/1982 | Chasek | 342/378 |
| 4,636,796 A | | 1/1987 | Imazeki | |
| 4,750,147 A | * | 6/1988 | Roy et al. | 708/801 |
| 4,833,478 A | | 5/1989 | Nossen | |
| 5,508,708 A | | 4/1996 | Ghosh et al. | |
| 5,541,608 A | * | 7/1996 | Murphy et al. | 342/442 |
| 5,786,791 A | | 7/1998 | Bruckert | |
| 5,903,844 A | | 5/1999 | Bruckert et al. | |
| 6,140,963 A | * | 10/2000 | Azzarelli et al. | 342/442 |

OTHER PUBLICATIONS

Sufficient conditions for alias–free direction of arrival estimation in periodic spatial spectra, M.G. Amin, IEEE Transactions on Antennas and Propagation, vol. 41(4), p. 508–511, Apr. 1993.*

Extended–aperture underwater acoustic multisource azimuth/elevation direction–finding using uniformly but sparsely spaced vector hydrophones, K.T. Wong et al., IEEE Journal of Oceanic Engineering, vol. 22(4), p. 659–672, Oct. 1997.*

P.A. Murphy, Performance Evaluation of a Blind Adaptive Antenna Array in Cellular Communications for Increasing Capacity, Master of Science Thesis, University of California, Davis, p. i, 60–62, 1993.*

G.A. Mazusawa, Performance of Hyperbolic Position Location Techniques for Code Division Multiple Access, Master of Science Thesis, Virginia Polytechnic Institute and State University, p. i–ii, Aug. 24–25, 1996.*

O. Røstbakken et al., Spatial Radio Channel Characterisation using SAGE Algorithm, NORSK Symposium I Signalbehandling, Sept. 1999.*

A. Kuchar, Real–Time Smart Antenna Processing for GSM1800, PhD Dissertation, Vienna University of Technology, Dec. 1999.*

* cited by examiner

Primary Examiner—Gregory C. Issing
Assistant Examiner—Fred H Mull
(74) Attorney, Agent, or Firm—Ingrassia Fisher & Lorenz PC

(57) ABSTRACT

Methods and apparatus are provided for determining a Direction of Arrival (DOA) of a remote unit (22) in a communication system (20). The apparatus includes a first antenna (32) and a second antenna (36) configured to receive an RF signal (32) having a plurality of scattered rays produced by multi-path scattering. A ray selector (114) of the apparatus is configured to identify a first ray and second ray from the scattered plurality of rays received at the first antenna (32) and the second antenna (36). A difference calculator (116) is configured to determine an amplitude difference (120) and a phase difference (122) between the first ray and said second ray, and an angle estimator (118) is configured to calculate a plurality of DOA values (142) based upon the phase difference (122) and select one of the plurality of DOA values (142) utilizing the amplitude difference (120).

26 Claims, 8 Drawing Sheets

METHODS AND APPARATUS FOR DETERMINING A DIRECTION OF ARRIVAL IN A WIRELESS COMMUNICATION SYSTEM

FIELD OF THE INVENTION

The present invention generally relates to a wireless communication system, and more particularly to methods and apparatus for determining a direction of arrival (DOA) of a signal transmitted by a remote unit in a wireless communication system.

BACKGROUND OF THE INVENTION

There are numerous applications that can use the location of a subscriber unit in a wireless communication system. For example, the location of the subscriber unit can be used for emergency services, so that police, fire and/or medical services can be dispatched to the location of the subscriber requesting such an emergency service. In addition, location of the subscriber unit can be used in detecting fraudulent use of the communication system, police investigations, and the like. Furthermore, the location of a subscriber unit can be used to improve performance of the wireless communication system. For example, wireless communication systems that utilize beam-forming transceivers can tune the beams based at least in part on the direction of arrival (DOA) of a signal from the subscriber unit.

Wireless communication systems currently have the capability for determining the location of a subscriber unit. For example, a subscriber unit can be located within a cell through identification of the base station antenna used to provide service in the cell. However, as a cell can have a one to three mile radius, the location of the subscriber unit is relatively imprecise and impractical for most applications. Additional systems have been proposed and implemented for determining the location of a subscriber unit, such as the use of a Global Positioning System (GPS) unit at the subscriber unit, triangulation onto a transmitting subscriber unit, and Amplitude Difference-based Angle Of Arrival Estimation (AD-AOA) as described in U.S. Pat. No. 5,786, 791, issued to Eugene J. Bruckert on Jul. 29, 1998 and assigned to Motorola, Inc., which is hereby incorporated by reference.

The AD-AOA estimation provides an accurate location of a subscriber unit in a wireless communication system, accounts for multi-path scattering of a received signal and unequal receiver gains. The AD-AOA estimation is preferably implemented with a phased antenna array having antenna elements that are spaced at a distance that is less than one-half of a wavelength of the carrier frequency of the received signal. However, the AD-AOA estimation and other location identification techniques and apparatus are preferably implemented with any number of phased antenna array configurations, including a configuration of a phased antenna array having antenna elements that are spaced at a distance that is greater than one-half of a wavelength of the carrier frequency of the received signal.

In view of the foregoing, is should be appreciated that it would be desirable to provide methods and apparatus for determining a DOA of a subscriber unit in a communication system. In addition, it should be appreciated that it would be desirable to provide methods and apparatus for determining a DOA of a subscriber unit in a communication system with any number of phased antenna array configurations, including a configuration of a phased antenna array having antenna elements that are spaced at a distance that is greater than one-half of a wavelength of the carrier frequency of the received signal. Furthermore, additional desirable features will become apparent to one skilled in the art from the following detailed description of the drawings and appended claims.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description of a preferred embodiment is merely exemplary in nature and is not intended to limit the invention or the application and uses of the invention.

Figure 1:
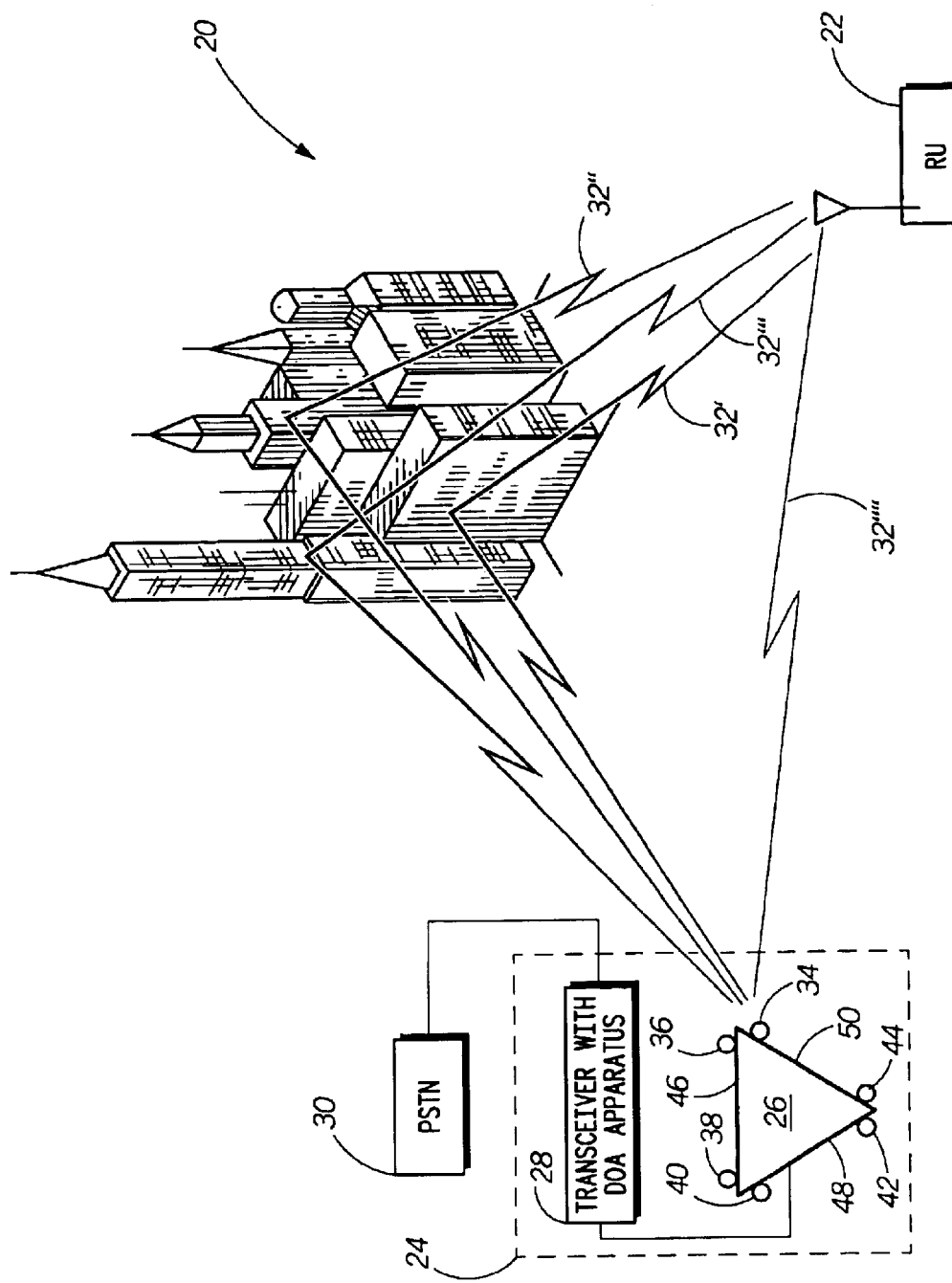
FIG. 1 is a wireless communication system according to a preferred exemplary embodiment of the present invention.

FIG. 1 is a block diagram of a wireless communication system 20 that includes an apparatus for determining the direction of arrival (DOA) of a remote unit (RU) 22 according to a preferred exemplary embodiment of the present invention. The wireless communication system 20 described in this detailed description of the drawings is directed to a cellular or personal communication systems (PCS). However, the principles discussed herein can be readily applied to other wireless based, radio, cable television (CATV), telephony or satellite telecommunication systems as well as other data communications systems. Furthermore, while the communication system 20 of the preferred exemplary embodiment of the present invention is configured to utilize a Code Division Multiple Access (CDMA) protocol as described in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (hereinafter referred to as the "IS-95A Reference Document"), which is hereby incorporated by reference, the communication system 20 may utilize other system protocols such as, but not limited to, the Narrowband Advanced Mobile Phone Service (NAMPS) protocol, the Advanced Mobile Phone Service (AMPS) protocol, the Personal Digital Cellular (PDC) protocol, the Global System for Mobile Communications (GSM) protocol, Two-Way Paging protocols, or the United States Digital Cellular (USDC) protocol and future generations thereof.

In addition to the remote unit 22, the communication system 20 includes, but is not limited to, a sectorized base site 24 having a phased antenna array 26 and transceiver with a DOA apparatus 28 in operative communication with another communication system, such as a public switched telephone network (PSTN) 30. The remote unit 22 transmits a radio frequency (RF) signal 32 that can be received by a first antenna 34, second antenna 36, third antenna 38, fourth antenna 40, fifth antenna 42 and sixth antenna 44 of the antenna array 26. The antennas (34,36,38,40,42,44) of the base site 24 can be configured to form the phased antenna array 26, or the antennas (34,36,38,40,42,44) of the base site 24 can be used in conjunction with an antenna or multiple antennas of other base sites to form the antenna array 26. The RF signal 32 received by the phased array antenna 26 is provided to the transceiver with DOA apparatus 28, which decodes and demodulates the RF signal 32 and identifies the DOA of the RF signal 32.

Figure 3:
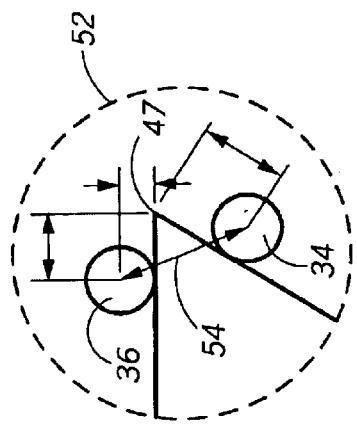
FIG. 3 is an enlarge view of the antenna array of FIG. 2 according to a preferred exemplary embodiment of the present invention.
Figure 2:
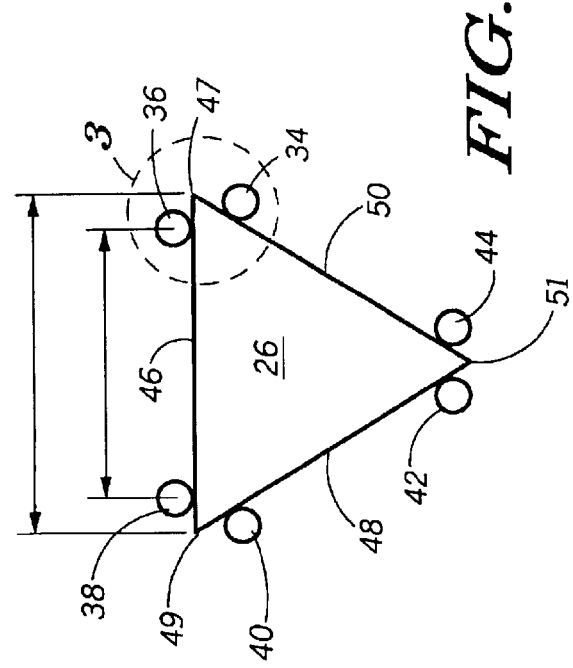
FIG. 2 is the antenna array of FIG. 1 according to a preferred exemplary embodiment of the present invention.
Figure 4:
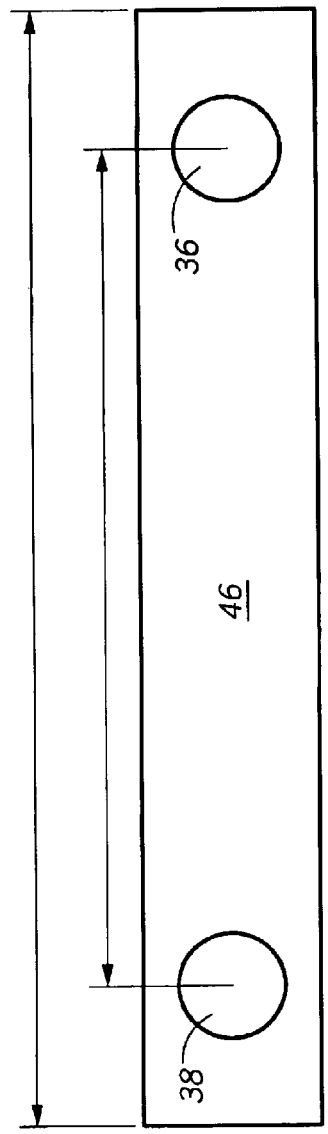
FIG. 4 is a side view of the antenna array of FIG. 2 according to a preferred exemplary embodiment of the present invention.

Referring to FIG. 2, FIG. 3 and FIG. 4, the antenna array 26 is configured to have a first side 46, a second side 48 and a third side 50 that provide a triangular supporting structure for the antennas (34,36,38,40,42,44). The antennas (34,36,38,40,42,44) are preferably placed at or near the corners of the three sides (46,48,50), and antenna pairs at or near the corners (47,49,51) (e.g., the first antenna 34 and the second antenna 36, the third antenna 38 and fourth antenna 40, and the fifth antenna 42 and the sixth antenna 44) are used to identify a DOA estimate of the signal transmitted by the remote unit. However, any number of antennas, antenna array configurations, antenna pairings, sides and supporting structure shapes can be utilized in accordance with the present invention.

There are two sets of antenna array characteristics that are preferably used for DOA estimation in accordance with the preferred embodiment of the present invention. The first antenna array characteristic is the positioning of the individual antenna elements within the array. The positioning of the individual antenna elements within the array yields phase differences between the signals received on each of the antennas, which are a function of the antenna positions and the DOA. (See, Hamid Krim and Mats Viberg, Two Decades of Array Signal Processing Research, IEEE Signal Processing Magazine, Vol. 13, No. 4, July 1996, for a description of the relationship between phase differences and DOA, which is hereby incorporated by reference.) The vector-valued collection of the phase differences can be expressed as:

$$a(\theta)=[a_1(\theta)a_2(\theta) \ldots a_N(\theta)]^T \quad (1)$$

Where $\theta$ is the DOA, $a_i(\theta)=\exp(j\phi i(\theta))$, $\phi i(\theta)$ is the complex valued phase shift of antenna element i, and $j=\sqrt{-1}$.

The second antenna array characteristic that enables the estimation of the DOA is the antenna directivity (i.e., the patterns of the antenna elements of the array). Each antenna element of the array has a gain and phase shift associated with each DOA. The vector-valued collection of the antenna element directivities for an antenna array can be expressed as:

$$b(\theta)=[b_1(\theta)b_2(\theta) \ldots b_N(\theta)]^T \quad (2)$$

Where $b_i(\theta)$ is the directivity pattern of antenna element i. The directivity patterns of the antenna elements can be modified from the isolated value for each antenna element using a mutual coupling configuration between the elements. This mutual coupling configuration between the elements can be utilized in accordance with the present invention with the use of directivities measured for the antenna elements while positioned in the desired array geometry.

The combination of the two characteristics due to the antenna element positions and directivities forms a vector-valued response function commonly referred to as the composite array manifold. The composite array manifold ($c(\theta)$) can be produced with a Hadamard product (i.e., element-wise product) of the two characteristics of the array and expressed as:

$$c(\theta)=a(\theta)\oplus b(\theta)=[a_1(\theta)b_1(\theta)a_2(\theta)b_2(\theta) \ldots a_N(\theta)b_N(\theta)]^T \quad (3)$$

Where $\oplus$ is the Hadamard product, $a(\theta)$ is the vector-valued collection of the phase differences of equation (1) and $b(\theta)$ is the vector-valued collection of the antenna element directivities for an antenna array of equation (2). While the foregoing composite array manifold production is used in this detailed description of the drawings, any number of techniques can be used in accordance with the present invention to exploit the different features of array manifolds for DOA estimation.

With particular reference to the enlarged view 52 of FIG. 3, the differential electrical phase ($\phi$) of the signal from the remote unit is a function of the DOA ($\theta$), separation distance (d) 54 between the first antenna 34 and second antenna 36 forming one of the antenna pair (i.e., inter-element spacing), and wavelength ($\lambda$) of the signal as follows:

$$\phi(\theta)=\phi_2(\theta)-\phi_1(\theta)=2\pi(d/\lambda)\sin(\theta) \quad (4)$$

While a separation distance (d) 54 that is approximately less than one-half the wavelength ($\lambda$) of the signal frequency produces a unique mapping between the differential electrical phase ($\phi$) and the DOA ($\theta$) within a one hundred and eighty degree (180°) range, a separation distance (d) 54 that is approximately greater than or equal to one-half of the wavelength ($\lambda$) (i.e., irregular antenna element spacing) introduces ambiguities in the mapping of the differential electrical phase ($\phi$) observed by the receiving antenna elements to the DOA ($\theta$).

Figure 5:
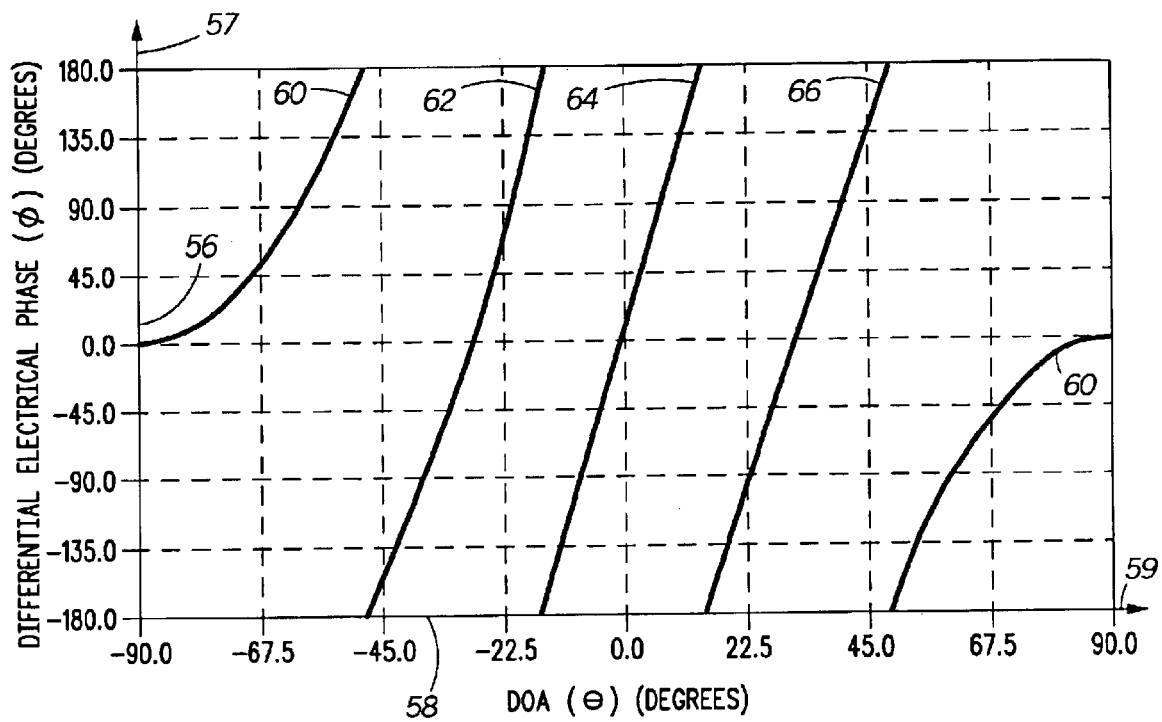
FIG. 5 is a graph illustrating the relationship between the differential electrical phase and the direction of arrival (DOA)
Figure 6:
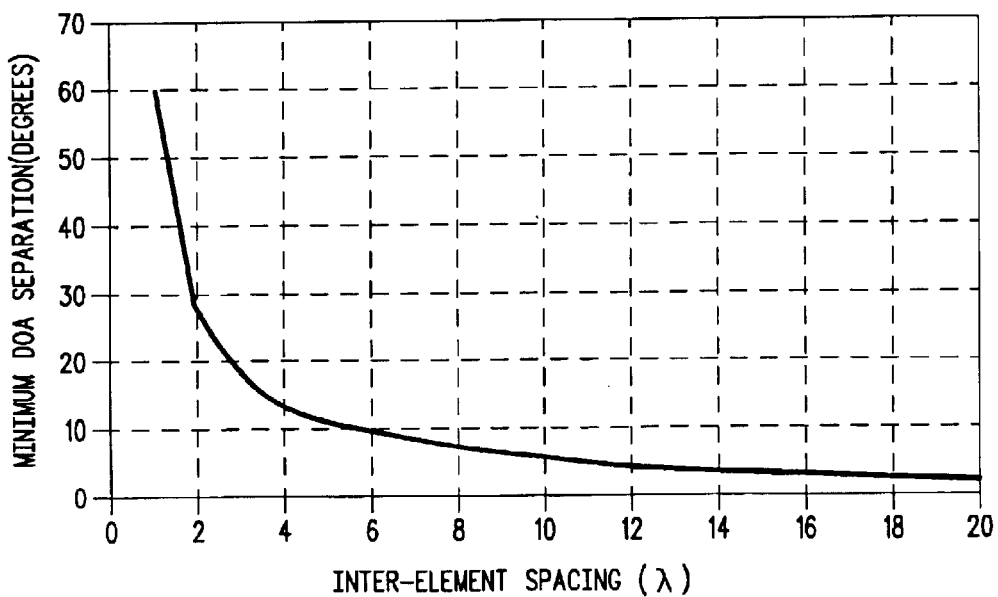
FIG. 6 is a graph illustrating the preferred minimum spacing solution for multiple DOA solutions of various inter-element spacing.

For example, the relationship between the differential electrical phase ($\phi$) 56 and the DOA ($\theta$) 58 is shown in FIG. 5 for a two-element array with two-wavelength inter-element spacing (d) and phase wrapping for the differential electrical phase ($\phi$) 56 having a magnitude greater than one hundred and eighty degrees (180°). For this two-wavelength inter-element spacing (d), there are four possible DOA solutions (60,62,64,66) for each of the differential electrical phases ($\phi$) 56. Therefore, to identify a DOA estimate, the apparatus for determining a DOA using these phase differences preferably distinguishes between the multiple solutions (e.g., distinguishes between the four DOA solutions (60,62,64,66)). Most preferably, the apparatus for determining the DOA of the RF signal distinguishes between multiple solutions that have the least amount of DOA separation. For example, fifteen degrees (15°) of ambiguity is preferably resolved for the two wavelength inter-element spacing, as the least amount of separation between two of the multiple solutions is thirty degrees (30°). (See FIG. 6 for examples of the resulting least DOA separation between multiple solutions for various inter-element spacing).

Figure 7:
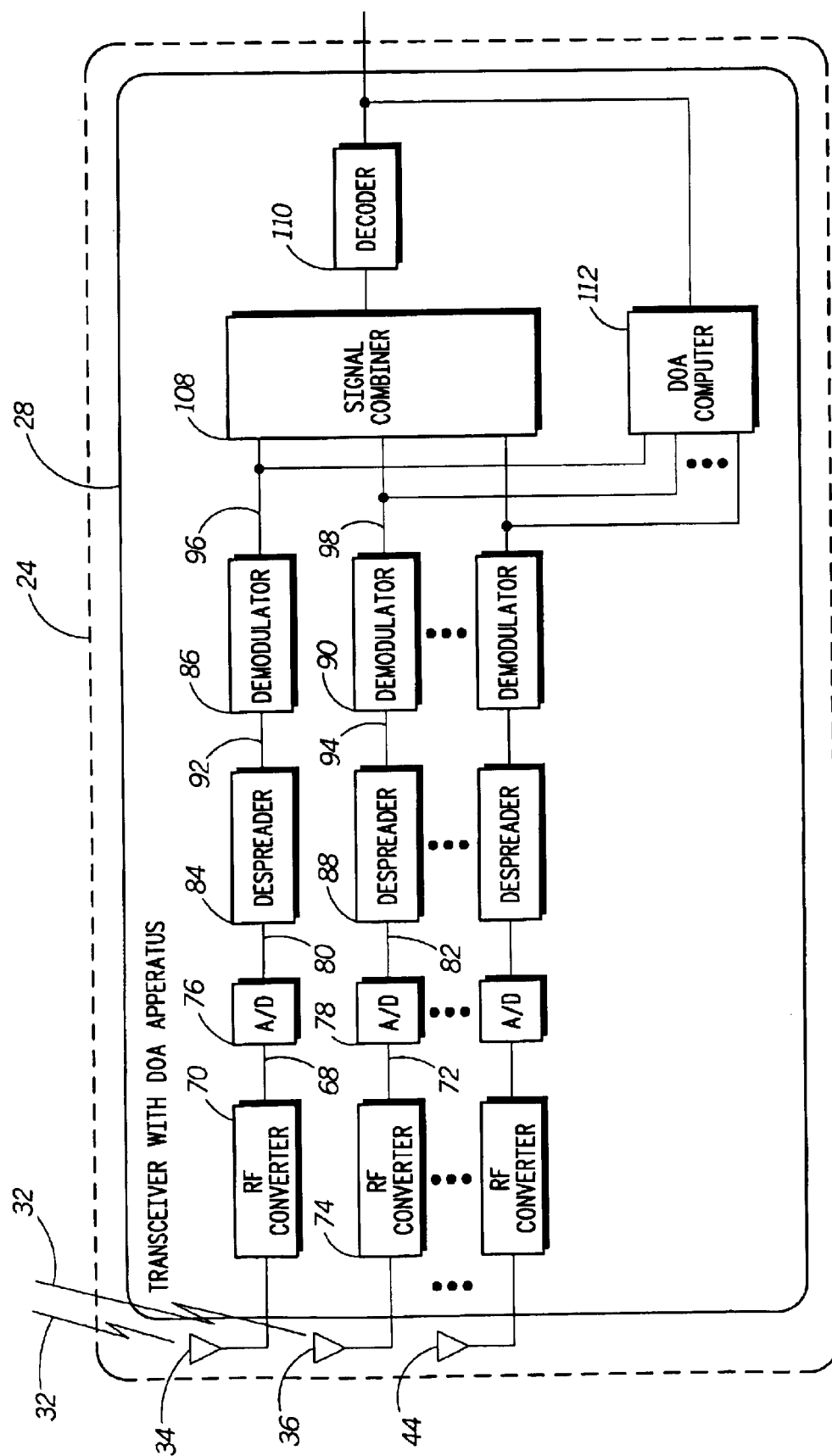
FIG. 7 is the transceiver with DOA apparatus of FIG. 1 according to a preferred exemplary embodiment of the present invention.

Referring to FIG. 7, the sectorized base site 24 of FIG. 1 is shown in additional detail that is configured to identify a DOA estimate of a remote unit with an antenna array having irregularly spaced antenna elements. While the following detailed description of the drawings is directed to a transceiver having the DOA apparatus, it should be understood that the DOA apparatus can be a separate component of the sectorized base site or located outside of the sectorized base site, including with the remote unit. Furthermore, while the following detailed description of the drawings is directed to identifying the DOA with the first antenna and second antenna in order to maintain simplicity and clarity, it should be understood that the description is applicable to other antennas of the antenna array and any combination thereof. In addition, while the following detailed description of the drawings is described with reference to a phased array antenna having irregular element spacing, the present invention is applicable to antenna arrays having regular element spacing (i.e., there is a separation distance (d) that is approximately less than one-half of the wavelength (λ) of the RF signal).

The RF signal 32 transmitted by the remote unit 22 is received at the first antenna 34 and the second antenna 36 within the sectorized base site 24. The first antenna 34 and second antenna 36 are configured to intercept electromagnetic radiation of the RF signal 32 within a selected frequency band. The first antenna 34 and second antenna 36 can be any number of electromagnetic interception devices, including, but not limited to a wave guide, a coaxial cable, an optical fiber or an infrared frequency transducer. The electromagnetic radiation of the RF signal 32 that is intercepted by the first antenna 34 and the second antenna 36 is converted to a first analog signal 68 with a first RF converter 70 and a second analog signal 72 with a second RF converter 74. The first analog signal 68 and second analog signal 72 are digitized with a first analog-to-digital (A/D) converter 76 and second A/D converter 78, respectively, to produce a first digitized signal 80 and a second digitized signal 82 representing the electromagnetic radiation intercepted by the first antenna 34 and the second antenna 36 within the intercepted frequency band. Alternatively, each of the antennas (34,36) may be coupled to a single RF converter and A/D converter for conversion and digitization.

The RF signal 32 received by the first antenna 34 and the second antenna 36, converted by the first RE converter 70 and second RF converters 74, and digitized with the first A/D converter 76 and second A/D converter 78 includes multiple scattered rays produced by multi-path scattering of the RF signal 32 during transmission from the remote unit, with each ray of the multiple scattered rays being a separate multi-path reflection of the RF signal 32. The multiple scattered rays produced by the multi-path scattering are generally arriving from different directions, at different time delays, and generally have different complex valued amplitudes (i.e., gain and phase components). Therefore the RF signal 32 received from the remote unit 22 generally includes multiple scattered rays having different complex amplitudes, times of arrival, and directions of arrival. The collection of voltages produced by each scattered ray ($r_j$) on the antenna array elements can be expressed as:

$$r_i(t) = c(\theta_i) s(t - \tau_i) \quad (5)$$

Where $\tau_i$ is the time delay of ray i, $\theta_i$ is the DOA of ray i, s(t) is the transmitted signal and $c(\theta_i)$ is the composite array manifold of equation (3). A model for the vector-valued received signal r(t) with multi-path scattering incorporating M rays can be expressed as:

$$r(t) = r_1(t) + r_2(t) + \ldots + r_M(t) \quad (6)$$

In a preferred exemplary embodiment of the present invention, the RF signal 32 is an encoded spread-spectrum digital signal having a multiplicity of frequency and time overlapping coded signals from the remote unit and other remote units within the communication system. The multiplicity of frequency and time overlapping coded signals are typically transmitted simultaneously at the same or substantially similar radio frequency and are distinguishable through specific modulation and spreading. In other words, the RF signal 32 received at the sectorized base site 24 is a composite signal of individual signals transmitted within the communication system, and the signal of an individual remote unit is generally distinguishable only after despreading and demodulation. Therefore, the first digitized signal 80 and second digitized signal 82 are presented to a first despreader 84 and first demodulator 86 and a second despreader 88 and second demodulator 90, respectively.

More specifically, the first and second digitized signals (80,82) are provided to the first and second despreaders (84,88) for despreading and generation of a first despread signal 92 and a second despread signal 94. The first despread signal 92 and second despread signal 94, representing the transmission from an individual remote unit, are then demodulated with the first demodulator 86 and second demodulator 90 into a first demodulated signal 96 and a second demodulated signal 98 having in-phase (I) and quadrature phase (Q) components.

Figure 8:
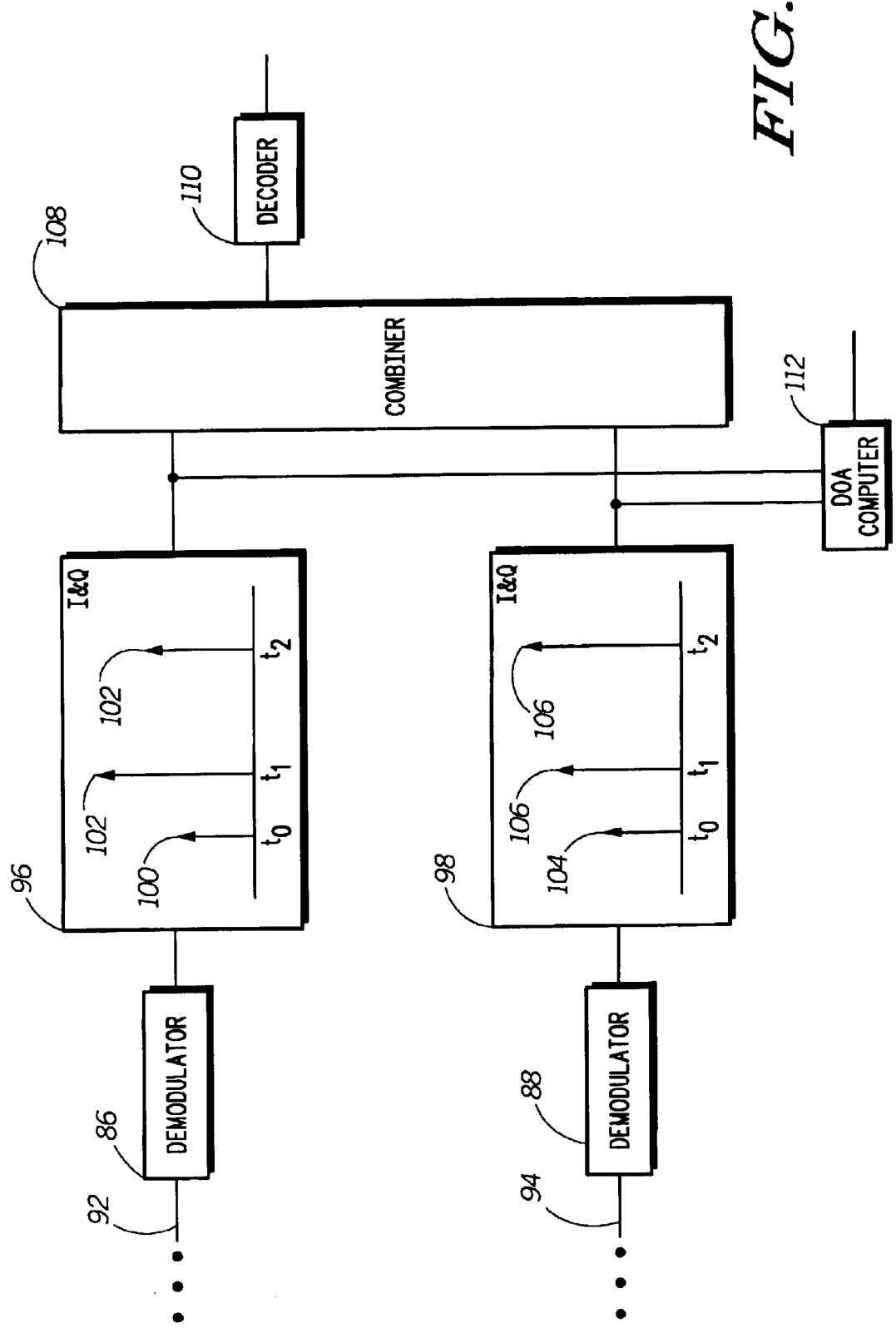
FIG. 8 is an enlarged view of the in-phase (I) and quadrature (Q) components of the demodulated signals that are generated by the demodulators of FIG. 7 and provided to the combiner and DOA computer for subsequent processing according to a preferred exemplary embodiment of the present invention.

As previously discussed in this detailed description of the drawings, the RF signal 32 received from the remote unit 22 generally includes multiple scattered rays having different amplitudes, directions of arrival and time delays, therefore the in-phase (I) and quadrature phase (Q) components of the first and second demodulated signals (96,98) have also undergone multiple reflections that result in echoes of the in-phase (I) and quadrature phase (Q) components. Referring to FIG. 8, examples of the in-phase (I) and quadrature (Q) components of the first and second demodulated signals (96,98) are shown in greater detail. The echoes of the in-phase (I) and quadrature phase (Q) components are generally of different amplitudes and different time delays, resulting in multiple scattered rays for each in-phase (I) and quadrature phase (Q) component of an individual remote unit.

More particularly, a first prompt ray 100 and a first plurality of echo rays 102 result for each in-phase (I) and quadrature phase (Q) component of the first demodulated signal 96 and a second prompt ray 104 and second plurality of echo rays 106 result for each in-phase (I) and quadrature phase (Q) component of the second demodulated signal 98. The first and second prompt rays (100,104) and first and second plurality of echo rays (102,106) generally have different amplitudes, DOAs and time delays. In a preferred embodiment, the despreading and demodulation functions isolate the plurality of time-delayed rays received at the antenna array. A matrix-valued signal (R) results from the despreading and demodulation, contains representations of the scattered plurality of rays (100,102,104,106) of the first and second demodulated signals (96,98) and can be expressed as:

$$R = [c(\theta_1) h(\tau_1) c(\theta_2) h(\tau_2) c(\theta_3) h(\tau_3)] = [r_1 r_2 r_3] \quad (7)$$

The first column ($r_1$) of the matrix-valued signal (R) represents the plurality of prompt rays (100,104) received by the antenna array. The subsequent columns ($r_2, r_3, r4_4 \ldots$) represent the subsequent time-delayed echoed rays (102, 106) as received by the antenna array. The scaling values ($h(\tau_i)$) represent a scaling due to the time delay of the echoes that is common across substantially all antenna elements. The values contained in the matrix-valued signal (R) are provided to a signal combiner 108, decoder 110 and DOA computer 112 for subsequent processing.

In a preferred exemplary embodiment of the present invention, the signal combiner 108 and decoder 110 are configured to perform CDMA combining and decoding of in-phase (I) and quadrature phase (Q) components of each remote unit as described in the IS-95A Reference Document. For example, the combiner 108 receives the in-phase (I) and quadrature phase (Q) components of the first and second prompt rays and the first and second plurality of echo rays and combines these scattered plurality of rays to form one coherent in-phase (I) and quadrature (Q) signal for each remote unit. This coherent in-phase (I) and quadrature (Q) signal generated from the scattered plurality of rays (100, 102,104,106) is grouped into predetermined length groups (e.g., sixty-four sample length groups) of sampled signals that are independently provided to the decoder 110, which is most preferably an orthogonal decoder, for subsequent decoding. In addition to generating the coherent in-phase (I) and quadrature (Q) signal from the scattered plurality of rays (100,102,104,106) for decoding with the decoder 110, the DOA computer 112 is configured to generate a DOA estimate from the scattered plurality of rays (100,102,104,106).

Figure 9:
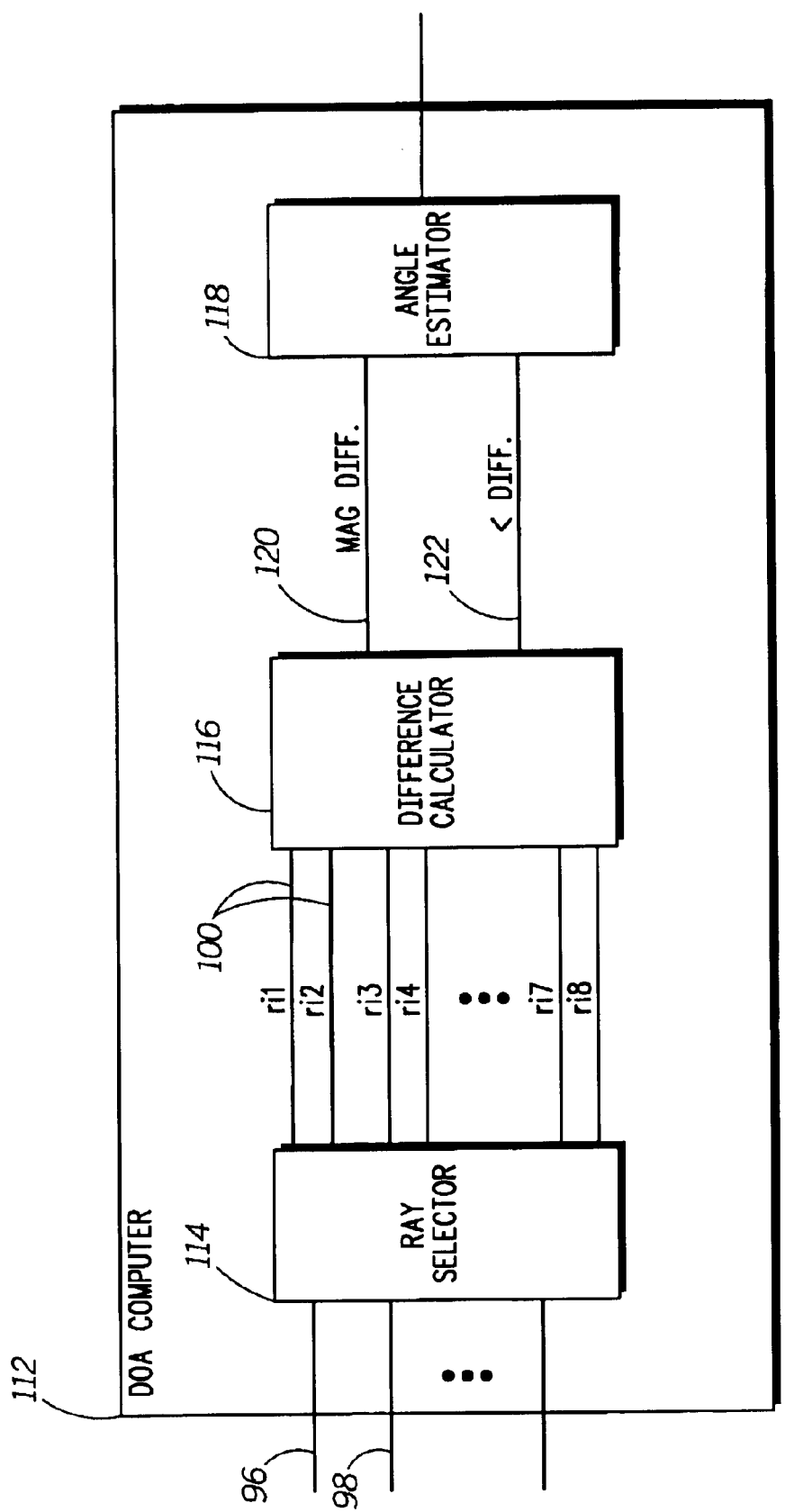
FIG. 9 is the DOA computer of FIGS. 7 and 8 according to a preferred exemplary embodiment of the present invention.

Referring to FIG. 9, the DOA computer 112 is shown in greater detail, which is configured to estimate a DOA. The DOA computer 112 includes a ray selector 114, difference calculator 116 and angle estimator 118. The ray selector 114 receives the demodulated signals (96,98) having the matrix-valued signals (R) from the demodulators and selects the prompt rays ($r_1 = [r_{11} r_{12}]^T$) of the matrix-valued signal (R) or one of the subsequent time-delayed echoed rays ($r_i = [r_{i1} r_{i2}]T$) for DOA estimation. The selected rays ($r_i$) 100 are provided to the difference calculator 116 for determination of an amplitude difference 120 and a phase difference 122 between the values of the selected rays ($r_i$) 100 for the two antenna elements (e.g., $r_{i1}$ and $r_{i2}$).

Figure 10:
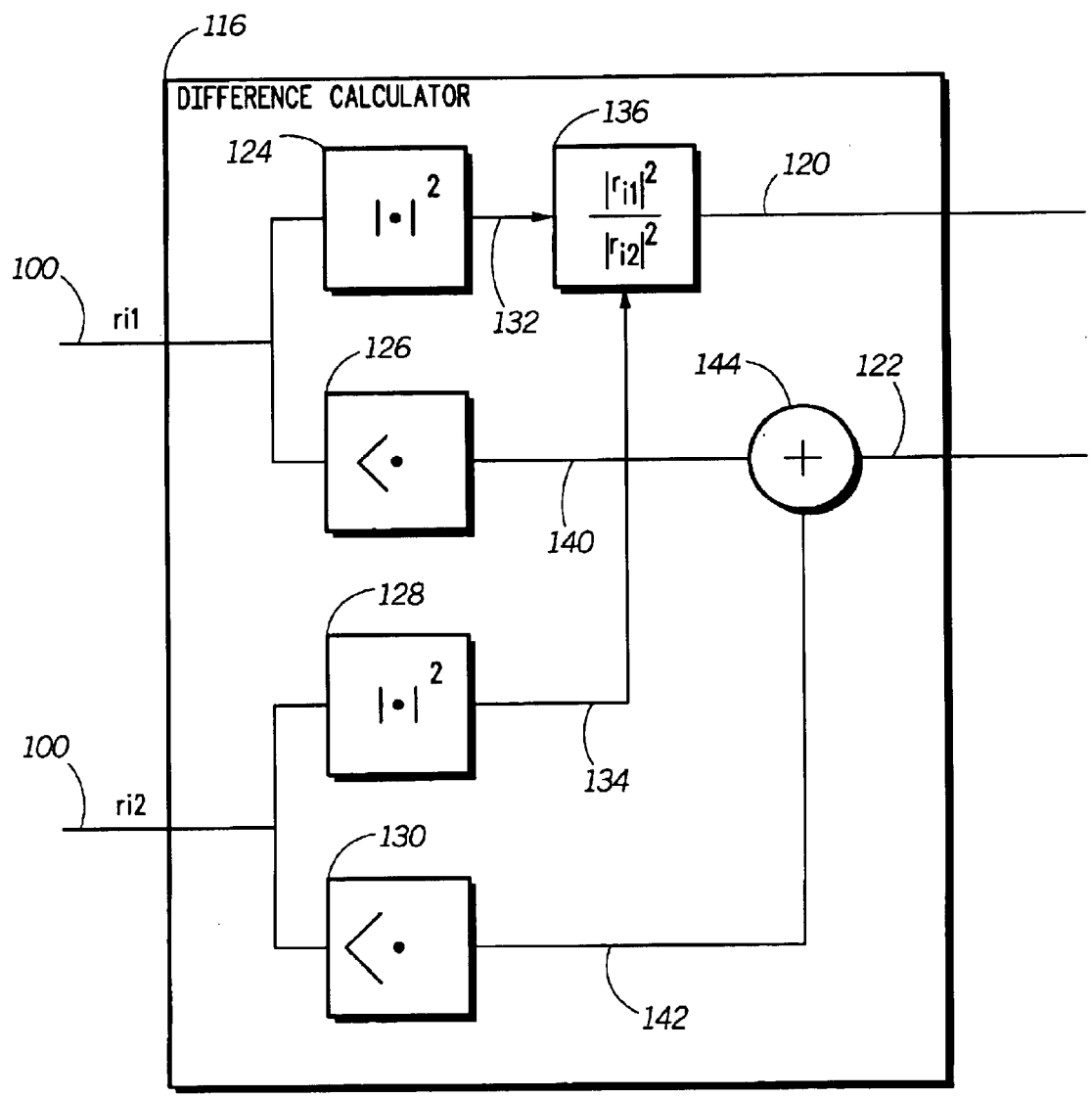
FIG. 10 is difference calculator of FIG. 9 according to a preferred exemplary embodiment of the present invention.

Referring to FIG. 10, the difference calculator 116 is shown in greater detail. The first value ($r_{i1}$) of the selected rays 100 is provided to a first magnitude calculator 124 and a first phase calculator 126 and the second value ($r_{i2}$) of the selected rays 100 is provided to a second magnitude calculator 128 and a second phase calculator 130. The first magnitude calculator 124 and second magnitude calculator 128 compute the magnitude of the first value ($|r_{i1}|^2$) 132 and the magnitude of the second value ($|r_{i2}|2$) 134, respectively. The magnitude of the first value ($r_{i1}|^2$) 132 and magnitude of the second value ($|ri_2|^2$) 134 are provided to a magnitude difference calculator 136 that produces the amplitude difference 120 between the first value ($r_{i1}$) and the second value ($r_{i2}$) (i.e., ($|r_{i1}|^2/|r_{i2}|^2$) or ($10\log_{10}(|r_{i1}|^2) - 10\log_{10}(|r_{i2}|^2)$)). In addition, the first phase calculator 126 and second phase calculator 130 compute the phase of the first value ($\angle r_{i1}$) 140 and phase of the second value ($\angle r_{i2}$) 142, respectively, which are provided to a phase difference calculator 144 that produces the phase difference 122 between the first value ($r_{i1}$) and the second value ($r_{i2}$). The phase difference 122 is provided to the angle estimator 118 for calculation of multiple DOA estimates and the amplitude difference 120 is also provided to the angle estimator 118 for selecting one of the multiple estimates as shown in FIG. 9.

Figure 11:
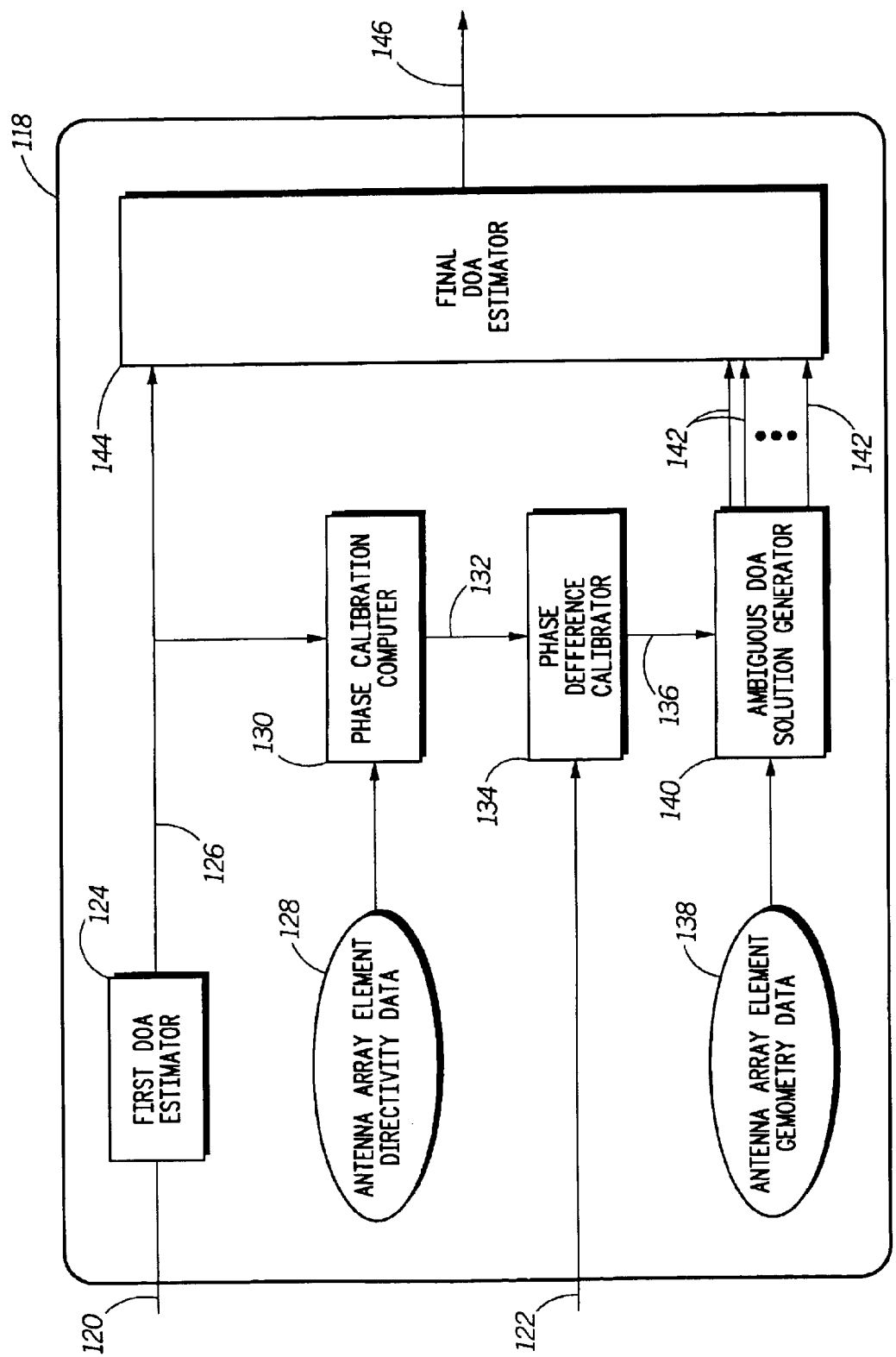
FIG. 11 is the angle estimator of FIG. 9 according to a preferred exemplary embodiment of the present invention.

Referring to FIG. 11, the angle estimator 118 is shown in greater detail. The magnitude difference is passed to a first DOA solution estimator 124, which is used to compute a first DOA estimate 126 ($\theta_1'$). The first DOA estimate 126 ($\theta_1'$) can be computed with any number of techniques, including the methods described in U.S. Pat. No. 5,786,791, issued to Eugene J. Bruckert on July 28, 1998 and assigned to Motorola, Inc., which is hereby incorporated by reference.

The first DOA estimate 126 ($\theta 1'$) and antenna array element directivity data 128, corresponding to the antenna array element directivities ($b(\theta)$) discussed with reference to equation (2), are provided to a phase calibration computer 130. The phase calibration computer 130 computes a phase calibration 132, which is used to remove the effect of the antenna element directivities 128 on the phase difference 122, delivering a calibrated phase difference 136.

The phase calibration 132 can be calculated using any number of techniques. For example, as can be appreciated by one of ordinary skill in the art, the selected column ($r_i$) 100 for the two antenna elements can be expressed in greater detail as follows:

$$r_i = [c_1(\theta_i) c_2(\theta_i)]^T h(\tau_i) \quad (8)$$

$$\text{or } r_i = [a_1(\theta_i) b_1(\theta_i) a_2(\theta_i) b_2(\theta_i)]^T h(\tau_i) \quad (9)$$

Where $b_1(\theta_i)$ and $b_2(\theta_i)$ are the antenna element directivity of the first antenna element and second antenna element, respectively (i.e., the antenna array element directivity data 128), $h(\tau_i)$ is a complex amplitude for the selected time delayed echo which is common to the antenna elements, and $a_k(\theta_i)$ represents the complex valued phase shift observed on antenna k due to the positioning of antenna element k and the DOA $\theta_i$, as previously discussed in this detailed description of the drawings. In a preferred embodiment, the phase difference calibration 132 ($\phi'$) is the phase difference between the directivities of the antenna array elements measured at the first DOA estimate 126 ($\theta_1'$), which can be expressed as follows:

$$\phi' = \angle(b_2(\theta_1')/b_1(\theta_1')) \quad (10)$$

Where $b_2(\theta_1')$ and $b_1(\theta_1')$ are the antenna element directivities of the first antenna element and second antenna element at the first DOA estimate 126 ($\theta_1'$), respectively.

The phase difference calibration 132 ($\phi'$) is provided to the phase difference calibrator 134, which preferably computes the calibrated phase difference 136 ($\phi''$) from the phase difference 122 ($\phi'$) and the phase difference calibration 132 ($\phi'$) as follows:

$$\phi'' = (\phi' - \phi') \mod 2\pi \quad (11)$$

The calibrated phase difference 136 ($\phi''$) is provided to an ambiguous DOA solution generator 138, which is also configured to receive antenna array element geometry data 138 that is sufficiently related to the antenna array geometry for use in deriving the vector-valued collection of the phase differences ($a(\theta)$).

The ambiguous DOA solution generator 140 calculates K ambiguous DOA values 142 ($\theta'' = [\theta_1'' \theta_2'' \theta_K'']^T$), preferably calculates the majority of ambiguous DOA values, and most preferably calculates substantially all or all the ambiguous DOA values, which yield the observed calibrated phase difference 136 ($\phi''$) for the given antenna array element geometry data 138. For example and with reference to FIG. 5, the multiple ambiguous DOA values 142 (i.e., the K ambiguous DOA values) can be selected with a reverse table-lookup operation of the ambiguous DOA values 142

($\theta''=[\theta_1''\theta_2''\theta_K'']^T$) along the DOA axis 59 that yields the observed calibrated differential electrical phase along calibrated differential electrical phase axis 57. Referring to FIG. 11, the ambiguous DOA values ($\theta''=[\theta_1''\theta_2''\theta_K'']^T$) 142 and the first DOA estimate 126 ($\theta_1'$) are provided to the final DOA estimator 144.

The final DOA estimator 144 selects a final DOA estimate 146 from the ambiguous DOA values 142 using the first DOA estimate 126. The final DOA estimate 146 is preferably selected from the ambiguous DOA values 142 that have a value with the least numerical difference from the first DOA estimate 126. Therefore, the final DOA estimator 144 utilizes the antenna array element directivities and the antenna array geometry to deliver the final DOA estimate 146.

While the invention has been particularly shown and described with reference to a particular preferred exemplary embodiment of the present invention, it will be understood by those skilled in the art that various changes in form and details may be made therein without departing from the spirit and scope of the invention, and it is intended that all such changes come within the scope of the following claims.

What is claimed is:

1. An apparatus for determining a Direction of Arrival (DOA) of a remote unit in a communication system, comprising:
   a first antenna and a second antenna configured to receive an RF signal from the remote unit, said RP signal including a plurality of scattered rays produced by multi-path scattering;
   a ray selector coupled to the first and the second antennas, the ray selector configured to identify a first ray from said scattered plurality of rays received at said first antenna and a second ray from said plurality of scattered rays received at said second antenna;
   a difference calculator coupled to the ray selector, the difference calculator configured to determine an amplitude difference and a phase difference between said first ray and said second ray; and
   an angle estimator coupled to the difference calculator, the angle estimator configured to calculate a plurality of DOA values based at least in part upon said phase difference and select one of said plurality of DOA values utilizing said amplitude difference.

2. The apparatus of claim 1, wherein a separation distance between said first antenna and said second antenna is greater than one-half of the wavelength of said RF signal.

3. The apparatus of claim 1, further comprising a third antenna and a fourth antenna configured to receive said RF signal including said plurality of scattered rays produced by multi-path scattering.

4. The apparatus of claim 3, wherein:
   said ray selector is configured to identify a third ray from said scattered plurality of rays received at said third antenna and a fourth ray from said plurality of scattered rays received at said fourth antenna;
   said difference calculator is configured to determine an second amplitude difference and a second phase difference between said third ray and said fourth ray; and
   said angle estimator is configured to calculate a second plurality of DOA values based upon said second phase difference and select one of said second plurality of DOA values utilizing said second amplitude difference.

5. The apparatus of claim 1, wherein the communication system is a code division multiple access (CDMA) communication system.

6. The apparatus of claim 1, wherein said RF signal is an encoded spread-spectrum digital signal having a multiplicity of frequency and time overlapping coded signals from the remote unit and a plurality of remote units other than the remote unit.

7. The apparatus of claim 1, wherein said first ray and said second ray are prompt rays.

8. The apparatus of claim 1, wherein said difference calculator comprises:
   a first magnitude calculator configured to calculate a first magnitude of said first ray;
   a second magnitude calculator configured to calculate a second magnitude of said second ray; and
   a magnitude difference calculator configured to receive said first magnitude and said second magnitude and produced said amplitude difference between said first ray and said second ray.

9. The apparatus of claim 1, wherein said difference calculator comprises:
   a first phase calculator configured to calculate a first phase of said first ray;
   a second phase calculator configured to calculate a second phase of said second ray; and
   a phase difference calculator configured to receive said first phase and said second phase and produced said phase difference between said first ray and said second ray.

10. The apparatus of claim 1, wherein said angle estimator comprises a first DOA solution estimator that is configured to receive said amplitude difference and calculate a first DOA estimate.

11. The apparatus of claim 10, wherein said angle estimator comprises a phase calibration computer that is configured to receive said first DOA estimate and directivity data of said first antenna and said second antenna and compute a phase calibration.

12. The apparatus of claim 11, wherein said angle estimator comprises a phase difference calibrator that is configured to receive said phase calibration and said phase difference and compute a calibrated phase difference.

13. The apparatus of claim 12, wherein said angle estimator comprises an ambiguous DOA solution generator that is configured to receive said calibrated phase difference and geometry data of said first antenna and said second antenna and calculate said plurality of DOA values.

14. The apparatus of claim 13, wherein said angle estimator comprises a final DOA estimator that is configured to receive said plurality of DOA values and said first DOA estimate, said final DOA estimator selecting one of said second plurality of DOA values utilizing a comparison between said plurality DOA values and said first DOA estimate.

15. The method of claim 13, wherein selecting one of said plurality of DOA values comprises conducting a comparison between said plurality DOA values and said first DOA estimate.

16. A method for determining a Direction of Arrival (DOA) of a remote unit in a communication system, comprising:
   receiving an RF signal from the remote unit at a first antenna and a second antenna within a sectorized site, said RF signal including a plurality of scattered rays produced by multi-path scattering;
   identifying a first ray from said scattered plurality of rays received at said first antenna and a second ray from said plurality of scattered rays received at said second antenna;

determining an amplitude difference and a phase difference between said first ray and said second ray;

calculating a plurality of DOA values based upon said phase difference; and selecting one of said plurality of DOA values utilizing said amplitude difference.

17. The method of claim 16, wherein a separation distance between said first antenna and said second antenna is greater than one-half of the wavelength of said RF signal.

18. The method of claim 16, wherein the communication system is a code division, multiple access (CDMA) communication system.

19. The method of claim 16, wherein said RF signal is an encoded spread-spectrum digital signal having a multiplicity of frequency and time overlapping coded signals from the remote unit and a plurality of remote units other than the remote unit.

20. The method of claim 16, wherein said first ray and said second ray are prompt rays.

21. The method of claim 16, wherein determining said amplitude difference and said phase difference between said first ray and said second ray comprises:

calculating a first magnitude of said first ray;

calculating a second magnitude of said second ray; and conducting a magnitude difference operation with said first magnitude and said second magnitude to produce said amplitude difference between said first ray and said second ray.

22. The method of claim 16, wherein determining said amplitude difference and said phase difference between said first ray and said second ray comprises:

calculating a first phase of said first ray;

calculating a second phase of said second ray; and conducting a phase difference operation with said first phase and said second phase to produce said phase difference between said first ray and said second ray.

23. The method of claim 16, wherein calculating said plurality of DOA values based upon said phase difference comprises calculating a first DOA estimate.

24. The method of claim 23, wherein calculating said plurality of DOA values based upon said phase difference comprises computing a phase calibration with said first DOA estimate and directivity data of said first antenna and said second antenna.

25. The apparatus of claim 24, wherein calculating said plurality of DOA values based upon said phase difference comprises computing a calibrated phase difference with said phase calibration and said phase difference.

26. The apparatus of claim 25, wherein calculating said plurality of DOA values based upon said phase difference comprises calculating said plurality of DOA values based upon said calibrated phase difference and geometry data of said first antenna and said second antenna.

* * * * *